United States Patent
Neelakanta et al.

(10) Patent No.: US 8,689,355 B1
(45) Date of Patent: Apr. 1, 2014

(54) SECURE RECOVERY OF CREDENTIALS

(75) Inventors: Janardana Neelakanta, Karnataka (IN); Suresh Krishnappa, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 119 days.

(21) Appl. No.: 13/220,775

(22) Filed: Aug. 30, 2011

(51) Int. Cl.
H04L 29/06 (2006.01)

(52) U.S. Cl.
USPC .................................. 726/29; 726/6; 713/165

(58) Field of Classification Search
None
See application file for complete search history.

(56) References Cited

U.S. PATENT DOCUMENTS

| | | | |
|---|---|---|---|
| 7,447,763 B2 | 11/2008 | Brown et al. | |
| 7,702,925 B2 * | 4/2010 | Northcutt et al. | 713/193 |
| 8,094,810 B2 * | 1/2012 | Hohenberger et al. | 380/28 |
| 8,291,490 B1 * | 10/2012 | Ahmed et al. | 726/17 |
| 2005/0129246 A1 * | 6/2005 | Gearhart | 380/278 |
| 2007/0245369 A1 * | 10/2007 | Thompson et al. | 725/30 |
| 2008/0005290 A1 * | 1/2008 | Nykanen et al. | 709/222 |
| 2008/0189213 A1 * | 8/2008 | Blake et al. | 705/59 |
| 2009/0210315 A1 * | 8/2009 | Jean et al. | 705/26 |
| 2010/0162408 A1 * | 6/2010 | Roever et al. | 726/26 |
| 2010/0250937 A1 * | 9/2010 | Blomquist et al. | 713/170 |
| 2012/0324225 A1 * | 12/2012 | Chambers et al. | 713/169 |

* cited by examiner

*Primary Examiner* — Michael R Vaughan
(74) *Attorney, Agent, or Firm* — BainwoodHuang

(57) ABSTRACT

An improved technique involves creating a new lockbox mechanism which is configured to work on a new or upgraded operating platform having different operating platform parameters, and then storing confidential information within the new lockbox (e.g., a copy of credentials which are also stored at a main site). When the new lockbox is then moved to the new or upgraded operating platform, the new lockbox mechanism properly works. Such operation enables the maintained compatibility with applications, control and maintenance of lockbox security throughout, and can be performed automatically and/or remotely.

16 Claims, 4 Drawing Sheets

SECURE RECOVERY OF CREDENTIALS

BACKGROUND

A conventional software lockbox mechanism senses operating platform parameters (e.g., a particular hostname, a particular network address, etc.) in its environment, and then securely stores information in encrypted form. The lockbox mechanism then decrypts the stored information only if the lockbox mechanism continues to sense the same operating platform parameters.

Accordingly, if the lockbox mechanism is copied to another platform which has different operating platform parameters (e.g., an attacker clones the lockbox mechanism), the lockbox mechanism running on the attacker's platform will not decrypt the stored information since the attacker's platform has different operating platform parameters.

With the above-described lockbox mechanism in place, applications are able to store sensitive data in the lockbox mechanism via function calls to the lockbox mechanism. For example, an application can store credentials, which the application requires in order to participate in an information exchange with a server, in the lockbox mechanism.

SUMMARY

Unfortunately, there are deficiencies in the above-described conventional software lockbox mechanism. For example, if the operating platform is significantly changed such as during an upgrade, the application may be unable to retrieve the credentials from the lockbox mechanism. Additionally, the application will be unable to retrieve credentials from the lockbox mechanism if the application and the lockbox mechanism are migrated to a new platform or installed at a recovery platform having different operating platform parameters.

In contrast to the conventional lockbox mechanism in which the application may be unable to retrieve the credentials from the lockbox mechanism as a result of an upgrade, an improved technique involves creating a new lockbox mechanism which is configured to work on a new or upgraded operating platform having different operating platform parameters, and then storing confidential information within the new lockbox (e.g., a copy of credentials which are also stored at a main site). When the new lockbox is then moved to the new or upgraded operating platform, the new lockbox mechanism properly works. Such operation enables the maintained compatibility with applications, control and maintenance of lockbox security throughout, and can be performed automatically and/or remotely.

One embodiment of the improved technique is directed to a method of transferring a set of secrets to a target machine. The method includes receiving a target machine identifier which identifies a particular characteristic of the target machine. The method also includes generating a secure file on a source machine based on the target machine identifier, the secure file (i) storing the set of secrets in an encrypted form and (ii) being constructed and arranged to provide access to a particular secret of the set of secrets in non-encrypted form on a machine identified while in the presence of the particular characteristic of the target machine. The method further includes delivering the secure file from the source machine to the target machine to enable the target machine to access the particular secret in non-encrypted form.

Additionally, some embodiments of the improved technique are directed to a system for transferring a set of secrets to a target machine. The system includes a network interface coupled to a network, a memory and a processor coupled to the memory, the processor configured to carry the method of transferring a set of secrets to a target machine.

Furthermore, some embodiments of the improved technique are directed to a computer program product having a non-transitory computer readable storage medium which stores code including a set of server instructions to carry the method of transferring a set of secrets to a target machine.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves creating a new lockbox mechanism which is configured to work on a new or upgraded operating platform having different operating platform parameters, and then storing confidential information within the new lockbox (e.g., a copy of credentials which are also stored at a main site). When the new lockbox is then moved to the new or upgraded operating platform, the new lockbox mechanism properly works. Such operation enables the maintained compatibility with applications, control and maintenance of lockbox security throughout, and can be performed automatically and/or remotely.

Figure 1:
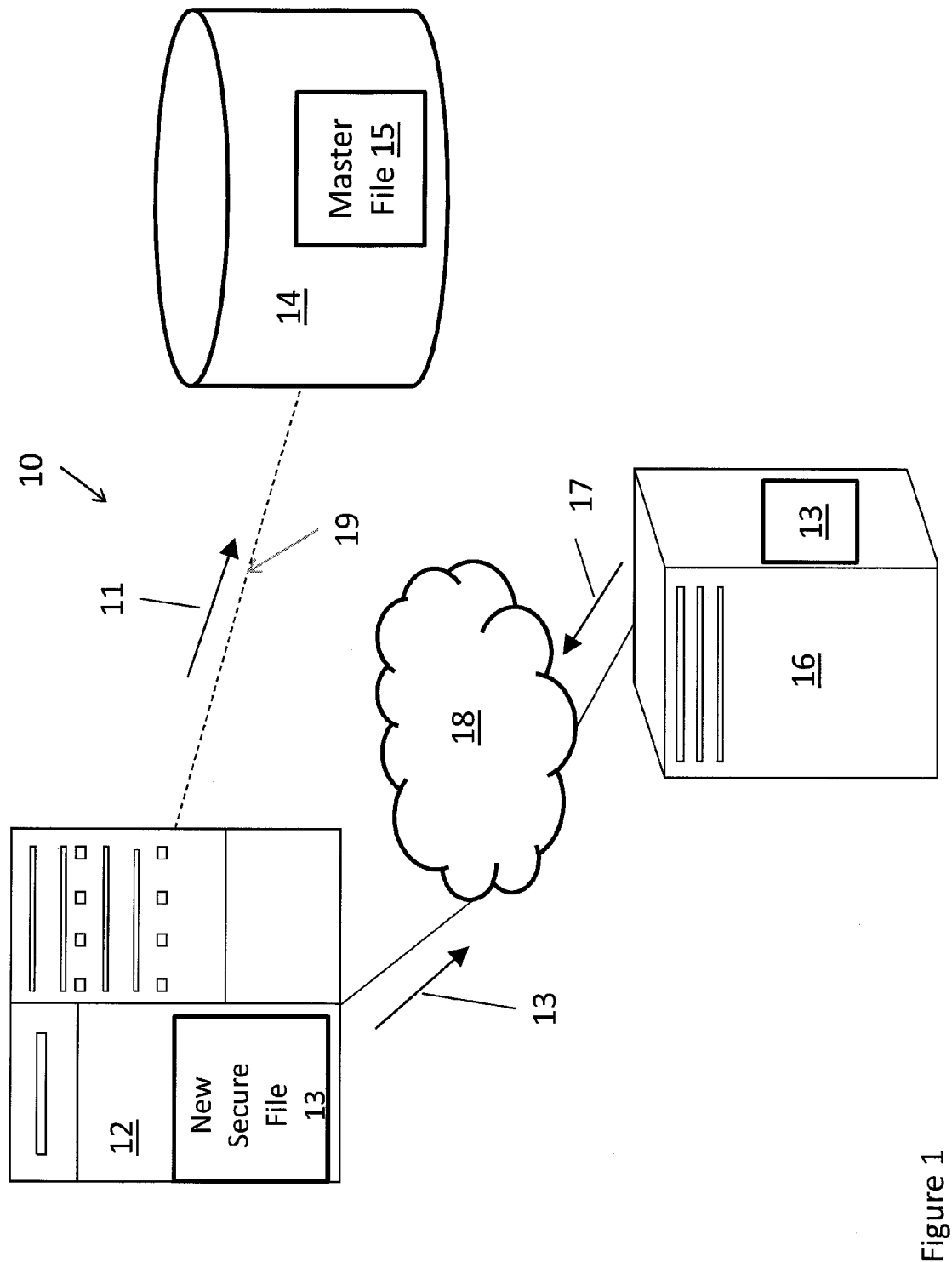
FIG. 1 is a schematic diagram illustrating an electronic environment for carrying out the improved technique.

FIG. 1 illustrates an electronic environment 10 for carrying out the improved technique. Electronic environment 10 includes source machine 12, external storage device 14, target machine 16 and communications medium 18.

Communication medium 18 provides connections between source machine 12, external storage device 14 and target machine 16. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

External storage device 14 is constructed and arranged to store a master secure file 15 which includes a set of credentials in a specifically encrypted form. An example of an application which generates such secure files is CST Lockbox, manufactured by EMC, Inc., Bedford, Mass. External storage device 14 is network-attached storage (NAS), although in some arrangements, external storage device 14 can be a part of a storage area network (SAN).

Target machine 16 is constructed and arranged to store a secure file which includes credentials needed perform functions which require.

Target machine 16 includes a number of components, to each of which an identifier 17 is associated. For example, a processor of target machine 16 may have a unique hostname assigned to it; such a hostname serves as one identifier. Other possible identifiers include a machine serial number, a media access control (MAC address), IP address, etc.

Source machine 12 is constructed and arranged to generate a secure file 13 based on machine identifiers 17 and credentials accessed from a master file 15. Source machine 12 is connected to external storage device 14 over a secure, local area network 19. Further details concerning source machine 12 are considered with respect to FIG. 2.

Figure 2:
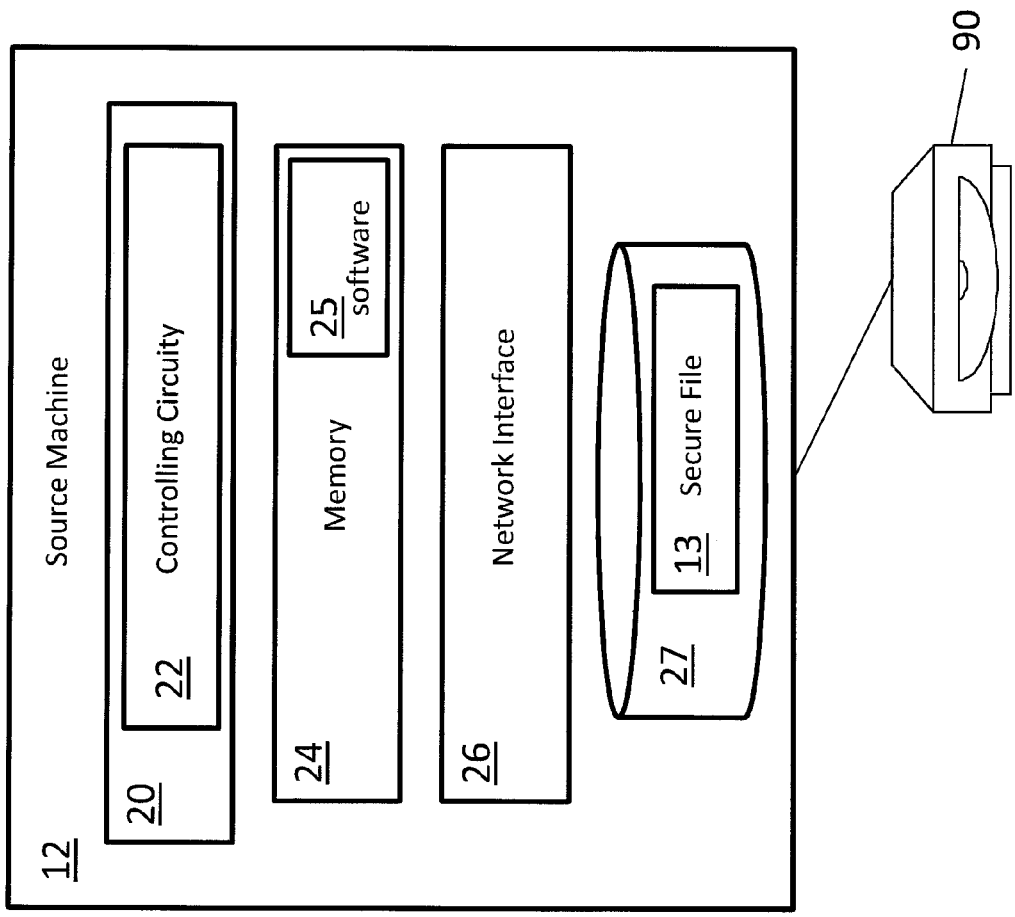
FIG. 2 is a schematic diagram illustrating the source machine shown in FIG. 1.

FIG. 2 illustrates components of source machine 12. Source machine 12 includes a controller 20 which in turn includes a processor 22, a memory 24 and a network interface 26.

Memory 24 is configured to store a computer program 90 which is constructed and arranged to transfer a set of secrets to target machine 16. Memory 24 stores code 25 which provides instructions in processor 22 to run computer program 90. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the computer program 90 stored in memory 24.

Network interface 26 is constructed and arranged to send and receive data over communications medium 18. Specifically, network interface 26 is configured to receive message data from and send messages to target machine 16 over communications medium 18.

Referring again to FIG. 1, suppose that, in a system which performs event management operations, target machine 16 is replaced or upgraded in such a way that it's identifiers have changed. During operation, target machine 16 sends new identifiers 17 to source machine 12. Source machine 12, after receiving identifiers 17, is prompted to generate a new secure file 13 which contain a new set of credentials for the target machine 16 to use in performing event management functions. Source machine 12 also stores identifiers 17 in memory 24.

When so prompted, source machine 12 accesses credentials which are kept within master secure file 15. Upon providing authorization to access the credentials, source machine 12 receives a copy of the credentials in non-encrypted form over secure LAN 19 and network interface 26 and stores the credentials in memory 24. Once both the identifiers 17 and the credentials have been received and stored in memory 24, processor 22 runs software 25 which generates a new secure file 13 which contains the credentials and is based on the identifiers. Specifically, software 25 attaches information from identifiers 17 to the credentials and encrypts the resulting credentials within the new secure file 13.

When new secure file 13 has been so constructed and stored in memory 24, processor 22 sends new secure file 13 to target machine 16. Processor 22 also sends a passcode to target machine 16, the passcode used to access the credentials in non-encrypted form.

Advantageously, the improved techniques enable the automatic and secure transfer of new credentials to target machine 16. Because source machine 12 encrypts the credentials in the secure file 13 using the identifiers 17 from the target machine 16 and directly sends the secure file 13 to the target machine 16, the credentials may only be exposed in non-encrypted form on target machine 16 and no other machine. This procedure then greatly reduces the risk that the credentials will be used on an unauthorized machine.

For example, suppose that the identifier is the unique hostname of target machine 16. Target machine 16 sends a request for credentials to source machine 12, the request including the unique hostname 17. Source machine 12 accesses a copy of the credentials in non-encrypted form and, based on the unique hostname, generates new secure file 13 and sends new secure file 13 directly to target machine 16. The credentials within the new secure file 13 may only be exposed in non-encrypted form if the hostname of the machine on which the new secure file 13 is stored matches the hostname from which the new secure file was generated. That is, if a different machine gains access to the new secure file 13, the different machine will not have access to the credentials.

In some arrangements, the target machine 16 is located at a site remote from the source machine 12. In this case, the communications medium 18 includes a connection between the local site at which source machine 12 is located and the remote site. In this case, source machine 12 sends new secure file 13 to the target machine 16 over the connection to the remote site.

In further arrangements, the connection to the remote site is a secure socket layer (SSL) connection. In this case, target machine 16 sends identifiers such as the unique hostname to the source machine 12. In some further arrangements, new secure file 13 requires a passcode in order that target machine 16 may access the credentials in non-encrypted form. In this case, source machine 12 sends the passcode to target machine 16 over the secure connection.

In some arrangements, processor 22 further runs an installer which installs, as part of the event management system, a certification management system on target machine 16. The certification management system is constructed and arranged to check credentials within the secure file 13 on target machine 16 upon execution of the software in target machine 16. In some further arrangements, source machine 12 securely deletes new secure file 13 from memory 24 once processor 22 completes installation of the software.

Figure 3A:
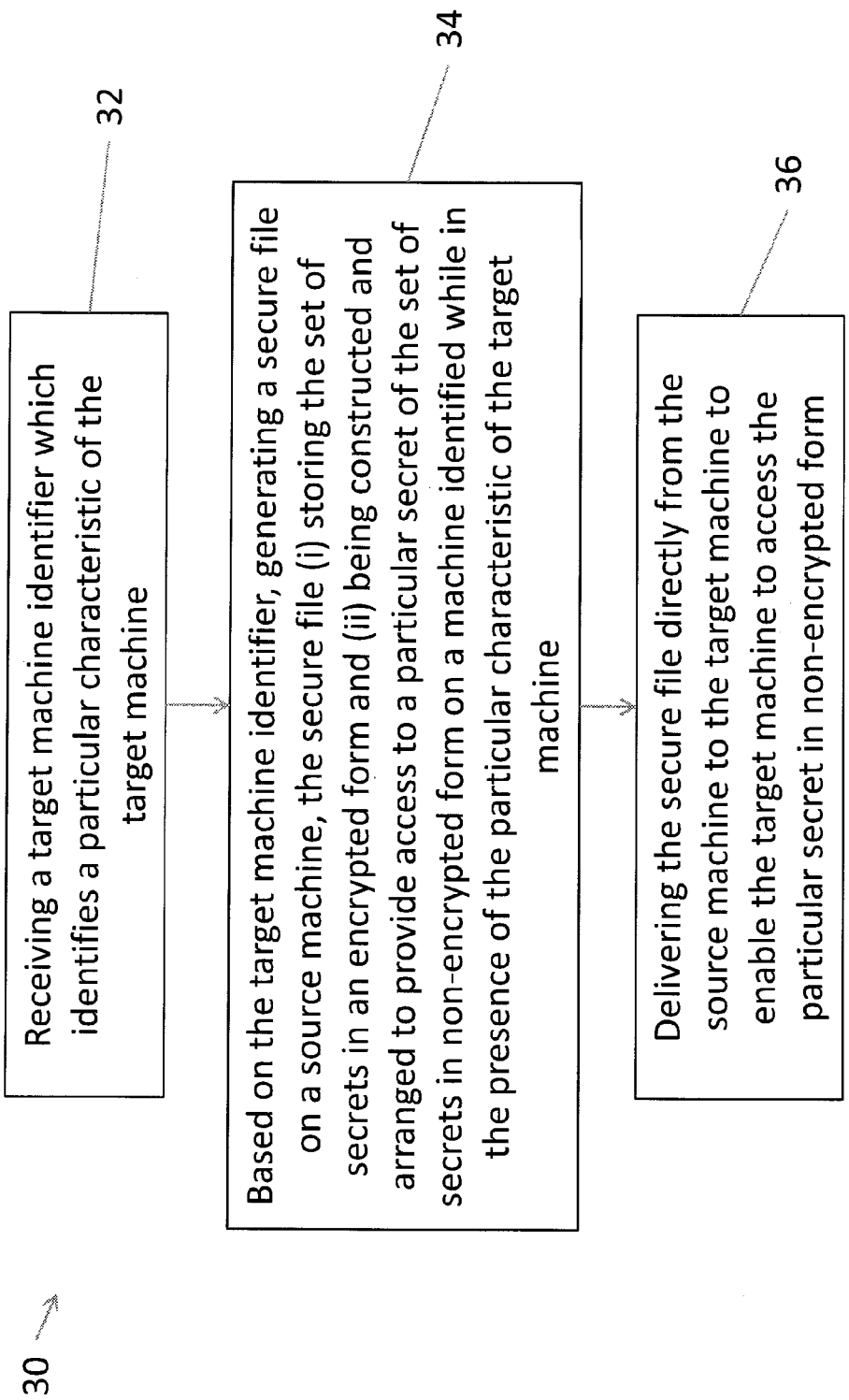
FIG. 3(a) is a flow chart illustrating a method of carrying out the improved technique within the electronic environment shown in FIG. 1.

FIG. 3(a) illustrates a method 30 of transferring a set of secrets to a target machine. In step 32, a target machine identifier which identifies a particular characteristic of the target machine is received. In step 34, based on the target machine identifier, a secure file is generated on a source machine, the secure file (i) storing the set of secrets in an encrypted form and (ii) being constructed and arranged to provide access to a particular secret of the set of secrets in non-encrypted form on a machine identified while in the presence of the particular characteristic of the target machine. In step 36, the secure file is delivered directly from the source machine to the target machine to enable the target machine to access the particular secret in non-encrypted form.

Figure 3B:
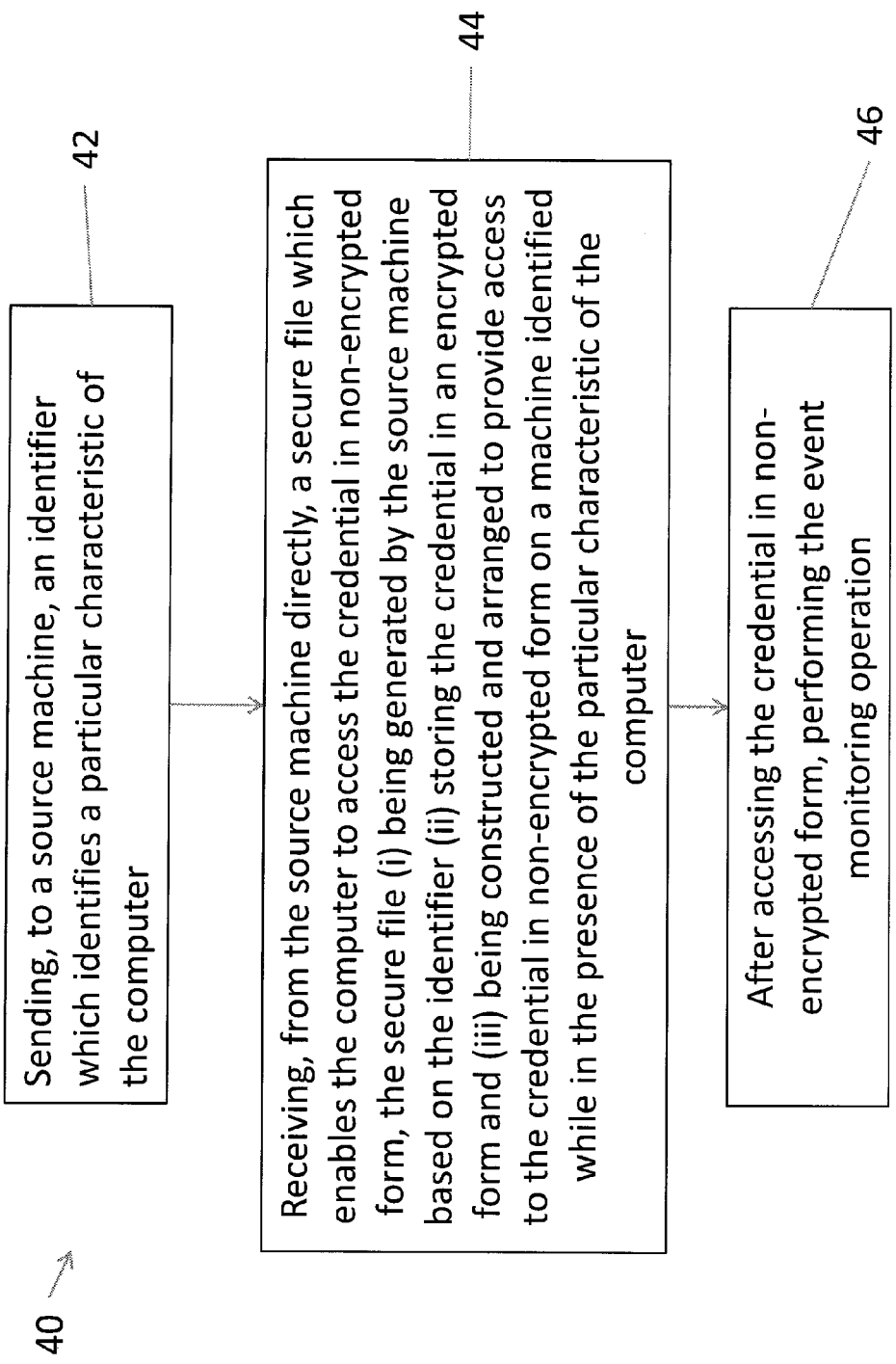
FIG. 3(b) is a flow chart illustrating another method of carrying out the improved technique within the electronic environment shown in FIG. 1.

FIG. 3(b) illustrates another method 40 of transferring a set of secrets to a target machine. In step 42, an identifier which identifies a particular characteristic of the computer is sent to the source machine. In step 44, a secure file which enables the computer to access the credential in non-encrypted form is received from the source machine directly, the secure file (i) being generated by the source machine based on the identifier (ii) storing the credential in an encrypted form and (iii) being constructed and arranged to provide access to the credential in non-encrypted form on a machine identified while in the presence of the particular characteristic of the computer. In step 46, submitting the credential to the server as part of the event management operation after accessing the credential in non-encrypted form.

While various embodiments of the invention have been particularly shown and described, it will be understood by those skilled in the art that various changes in form and details may be made therein without departing from the spirit and scope of the invention as defined by the appended claims.

For example, the description of the improved techniques heretofore has been applied to event management systems. Other credential-based systems (e.g., adaptive authentication systems, etc.) are able to take advantage of these improved techniques.

Further, the secure connection used to connect target computer 16 to source computer 12 can use a secure protocol other than SSL, e.g., transport layer security (TLS).

Furthermore, it should be understood that some embodiments are directed to source machine 12 which transfers a set of secrets to a target machine. Some embodiments are directed to source machine 12. Some embodiments are directed to a system which transfers a set of secrets to a target machine. Some embodiments are directed to a process of transferring a set of secrets to a target machine. Also, some embodiments are directed to a computer program product which enables computer logic to transfer a set of secrets to a target machine.

In some arrangements, source machine 12 is implemented by a set of processors or other types of control/processing circuitry running software. In such arrangements, the software instructions can be delivered to source machine 12 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of transferring a set of secrets to a target machine, comprising:
    receiving a target machine identifier which identifies a particular characteristic of the target machine;
    based on the target machine identifier, generating a secure file on a source machine, the secure file (i) storing the set of secrets in an encrypted form and (ii) being constructed and arranged to provide access to a particular secret of the set of secrets in non-encrypted form on a machine identified while in the presence of the particular characteristic of the target machine;
    delivering the secure file directly from the source machine to the target machine to enable the target machine to access the particular secret in non-encrypted form;
    wherein a particular characteristic of the target machine identified by the target machine identifier includes an expected hostname of the target machine; and
    wherein generating the secure file on the source machine includes:
        providing, as the secure file, an electronic file which is configured to (i) expose the particular secret in non-encrypted form when an actual hostname acquired during an attempt to access the particular secret in non-encrypted form matches the expected hostname of the target machine, and (ii) refrain from exposing the particular secret in non-encrypted form when the actual hostname acquired during an attempt to access the particular secret in non-encrypted form does not match the expected hostname of the target machine.

2. A method according to claim 1, wherein a lockbox application
    runs on the source machine;
    wherein providing the electronic file includes:
        providing a password to the lockbox application to obtain secure access to a local lockbox file;
        after obtaining the secure access to the local lockbox file, extracting, as the particular secret, a target machine credential from the local lockbox file; and
        embedding the target machine credential within the electronic file;
    wherein delivering the secure file includes:
        sending the electronic file to the target machine.

3. A method according to claim 2, wherein the method further comprises:
    after sending the electronic file to the target machine, securely deleting the secure file from the source machine.

4. A method according to claim 3, wherein the target machine is located at a remote site, the remote site being connected to the source machine over a network;
    wherein sending the electronic file to the target machine includes:
        sending the electronic file to the target machine over the network; and
    wherein sending the message to the target machine includes:
        sending the message to the target machine over the network.

5. A method according to claim 4, wherein the network is a secure network;
    wherein receiving the target machine identifier includes:
        receiving, from the target machine, the target machine identifier over the secure network;
    wherein providing the electronic file includes:
        generating a password which is constructed and arranged to enable an authorized user at the target machine to access to the target machine credential.

6. A method according to claim 5, wherein the target machine is constructed and arranged to perform event management operations which require the submission of credentials to a server;
    wherein the source machine runs an installer program which is constructed and arranged to install, on the target machine, software which causes the target machine to perform the event management operations;
    wherein the method further comprises:
        installing, as part of the software, a certification management system onto the target machine, the certification management system being constructed and arranged to retrieve the credentials in non-encrypted form from the electronic file.

7. A method of updating a credential on a computer, the credential being constructed and arranged to enable the computer to perform an event monitoring operation, the method comprising:
    sending, to a source machine, an identifier which identifies a particular characteristic of the computer;
    receiving, from the source machine directly, a secure file which enables the computer to access the credential in non-encrypted form, the secure file (i) being generated by the source machine based on the identifier (ii) storing the credential in an encrypted form and (iii) being constructed and arranged to provide access to the credential in non-encrypted form on a machine identified while in the presence of the particular characteristic of the computer; and after accessing the credential in non-encrypted form, performing the event monitoring operation;

wherein a particular characteristic of the computer identified by the identifier includes an expected hostname of the computer; and wherein receiving the secure file on the source machine includes:
obtaining, as the secure file, an electronic file which is configured to (i) expose the credential in non-encrypted form when an actual hostname acquired during an attempt to access the credential in non-encrypted form matches the expected hostname of the computer, and (ii) refrain from exposing the credential in non-encrypted form when the actual hostname acquired during an attempt to access the credential in non-encrypted form does not match the expected hostname of the computer.

8. A method according to claim 7, wherein the computer is located at a remote site, the remote site being connected to the source machine over a network;
wherein obtaining the electronic file includes:
receiving the electronic file from the source machine over the network.

9. A method according to claim 8, wherein the network is a secure network;
wherein sending the target machine identifier includes:
sending the target machine identifier over the secure network;
wherein obtaining the electronic file includes:
receiving a password which is constructed and arranged to enable an authorized user at the computer to access to the credential.

10. A system constructed and arranged to transfer credentials stored in a main lockbox to a new computer, the system comprising:
a network interface;
a memory; and
a controller which includes controlling circuitry coupled to the memory, the controlling circuitry constructed and arranged to:
receive a target machine identifier which identifies a particular characteristic of the target machine;
based on the target machine identifier, generate a secure file on a source machine, the secure file (i) storing the set of secrets in an encrypted form and (ii) being constructed and arranged to provide access to a particular secret of the set of secrets in non-encrypted form on a machine identified while in the presence of the particular characteristic of the target machine;
deliver the secure file from the source machine to the target machine to enable the target machine to access the particular secret in non-encrypted form;
wherein a particular characteristic of the target machine identified by the target machine identifier includes an expected hostname of the target machine; and
wherein generating the secure file on the source machine includes:
providing, as the secure file, an electronic file which is configured to (i) expose the particular secret in non-encrypted form when an actual hostname acquired during an attempt to access the particular secret in non-encrypted form matches the expected hostname of the target machine, and (ii) refrain from exposing the particular secret in non-encrypted form when the actual hostname acquired during an attempt to access the particular secret in non-encrypted form does not match the expected hostname of the target machine.

11. A system according to claim 10, wherein a lockbox application
runs on the source machine;
wherein providing the electronic file includes:
providing a password to the lockbox application to obtain secure access to a local lockbox file;
after obtaining the secure access to the local lockbox file, extracting, as the particular secret, a target machine credential from the local lockbox file; and
embedding the target machine credential within the electronic file;
wherein delivering the secure file includes:
sending the electronic file to the target machine.

12. A system according to claim 11, wherein the controlling circuitry is further constructed and arranged to:
after sending the electronic file to the target machine, securely delete the secure file from the source machine.

13. A system according to claim 12, wherein the target machine is located at a remote site, the remote site being connected to the source machine over a network;
wherein sending the electronic file to the target machine includes:
sending the electronic file to the target machine over the network; and
wherein sending the message to the target machine includes:
sending the message to the target machine over the network.

14. A system according to claim 13, wherein the network is a secure network;
wherein receiving the target machine identifier includes:
receiving, from the target machine, the target machine identifier over the secure network;
wherein providing the electronic file includes:
generating a password which is constructed and arranged to enable an authorized user at the target machine to access to the target machine credential.

15. A computer program product having a non-transitory computer readable storage medium which stores a set of instructions to transfer credentials stored in a main lockbox to a new computer, the set of instructions, when carried out by a source machine, causing the source machine to:
receive a target machine identifier which identifies a particular characteristic of the target machine;
based on the target machine identifier, generate a secure file on a source machine, the secure file (i) storing the set of secrets in an encrypted form and (ii) being constructed and arranged to provide access to a particular secret of the set of secrets in non-encrypted form on a machine identified while in the presence of the particular characteristic of the target machine;
deliver the secure file from the source machine to the target machine to enable the target machine to access the particular secret in non-encrypted form;
wherein a particular characteristic of the target machine identified by the target machine identifier includes an expected hostname of the target machine; and
wherein generating the secure file on the source machine includes:
providing, as the secure file, an electronic file which is configured to (i) expose the particular secret in non-encrypted form when an actual hostname acquired during an attempt to access the particular secret in non-encrypted form matches the expected hostname of the target machine, and (ii) refrain from exposing the particular secret in non-encrypted form when the actual hostname acquired during an attempt to access the particular secret in non-encrypted form does not match the expected hostname of the target machine.

16. A computer program product according to claim 15, wherein a
- lockbox application runs on the source machine;
- wherein providing the electronic file includes:
  - providing a password to the lockbox application to obtain secure access to a local lockbox file;
  - after obtaining the secure access to the local lockbox file, extracting, as the particular secret, a target machine credential from the local lockbox file; and
  - embedding the target machine credential within the electronic file;
- wherein delivering the secure file includes:
  - sending the electronic file to the target machine.

\* \* \* \* \*